United States Patent [19]

Okano

[11] 3,784,295
[45] Jan. 8, 1974

[54] PRESSURE PLATE MEANS FOR PROJECTORS AND THE LIKE

[75] Inventor: Takeshi Okano, Nishinomiya, Japan

[73] Assignee: Fuji Shashin Film Kabushiki Kaisha, Kanagawa-ken, Japan

[22] Filed: June 21, 1971

[21] Appl. No.: 154,952

[30] Foreign Application Priority Data
July 1, 1970 Japan.............................. 45/65794

[52] U.S. Cl. ................................................ 353/95
[51] Int. Cl. ............................................. G03b 1/48
[58] Field of Search ................... 353/95, 96, 22, 23, 353/26; 352/221, 225

[56] References Cited
UNITED STATES PATENTS
2,412,551  12/1946  Pratt..................................... 353/95

FOREIGN PATENTS OR APPLICATIONS
757,273  9/1956  Great Britain....................... 353/95

Primary Examiner—Louis R. Prince
Assistant Examiner—A. J. Mirabito
Attorney—Stevens, Davis, Miller & Mosher

[57] ABSTRACT

A pair of pressure plate members for clamping a film in the focal plane of a projector from both sides thereof are pivoted to one ends of a pair of levers for opening and closing operation. The two levers are operated by means of a solenoid in such a manner that one of them reaches the focal plane before the other one does.

9 Claims, 6 Drawing Figures

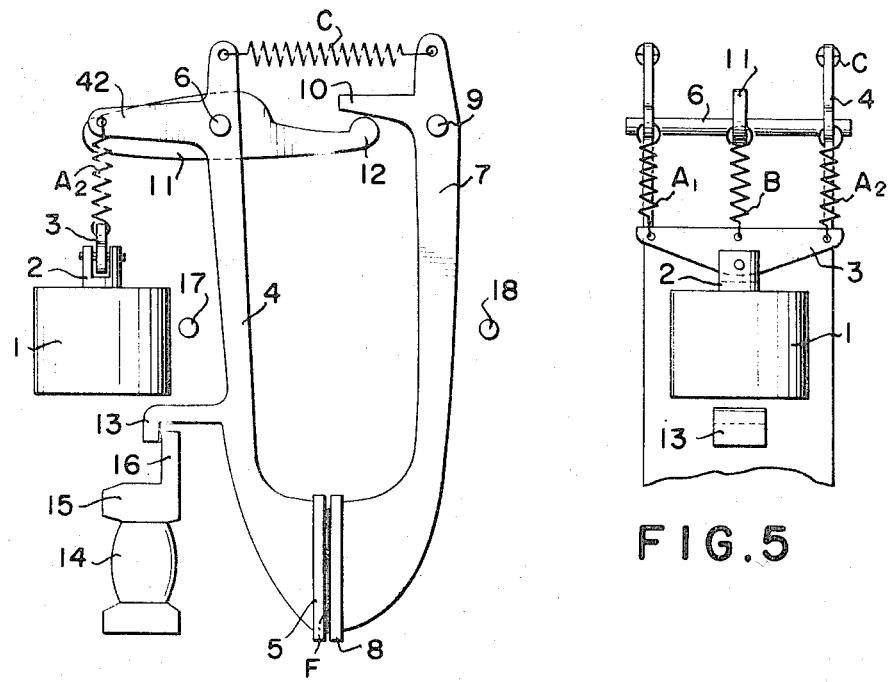
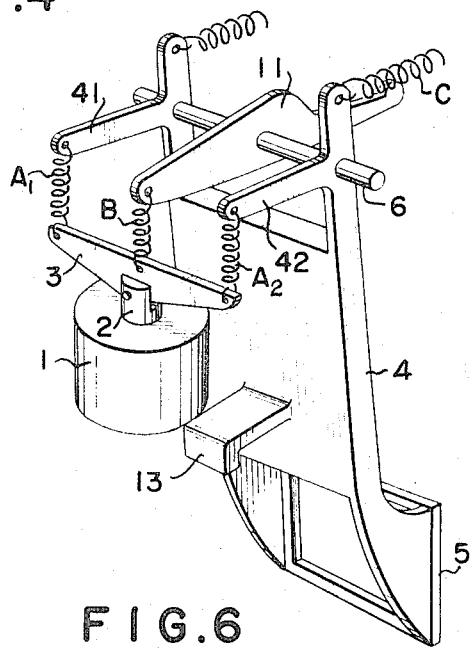

PRESSURE PLATE MEANS FOR PROJECTORS AND THE LIKE

BACKGROUND OF THE INVENTION

This invention relates to pressure plate means for projectors, and more particularly to novel pressure plate means consisting of a pair of pressure plate members which are movable longitudinally of a film while being spaced from the surfaces of the film.

Motion picture projectors, slide projectors, microfilm readers and the like are generally provided with pressure plate means for accurately positioning a film in the focal plane. This pressure plate means consists usually of a transparent glass held stationary in the focal plane and a movable transparent glass which will be brought into pressure contact with said stationary transparent glass, said movable glass being spaced from the stationary glass during travel of the film but being brought into pressure contact with said stationary glass clamping the film therebetween when said film has stopped its movement. In such a conventional pressure plate means, therefore, the film has been liable to damage due to friction with the surface of the stationary glass. This has been a problem particularly when an image is small as in the case of microfilm, and has been a fatal drawback of the conventional pressure plate means.

SUMMARY OF THE INVENTION

An object of the present invention is to provide pressure plate means which does not damage the surface of a film to be projected.

Another object of the invention is to provide a pressure plate means which makes it possible to feed a film, with a film holder mounted thereon which is thicker than said film.

Still another object of the invention is to provide pressure plate means by which the film surface is accurately positioned in the focal plane.

In order to attain these objects, pressure plate means according to the present invention comprises a pair of pressure plate members which are movable away from the focal plane in a direction of the optical axis and spaced relatively remotely from the path of film.

In the present invention, a pair of the pressure plate members are connected mechanically with each other and, during the positioning of a film, one member reaches the focal plane before the other member does and thereafter, the other member is brought into pressure contact with said one member with said film clamped therebetween, whereby the film is positively positioned in the focal plane.

Other objects, features and advantages of the invention will become apparent from the following description of an embodiment thereof.

BRIEF DESCRIPTION OF THE DRAWING

FIG. 4 is a similar side elevational view but shows the state in which both of the pressure plate members are positioned in the focal plane clamping the film therebetween;

FIG. 5 is a front elevational view of the pressure plate means of the invention in the state of FIG. 4; and FIG. 6 is a perspective view showing an operating portion of the solenoid of the pressure plate means of the invention.

PREFERRED EMBODIMENT OF THE INVENTION

Figure 1:
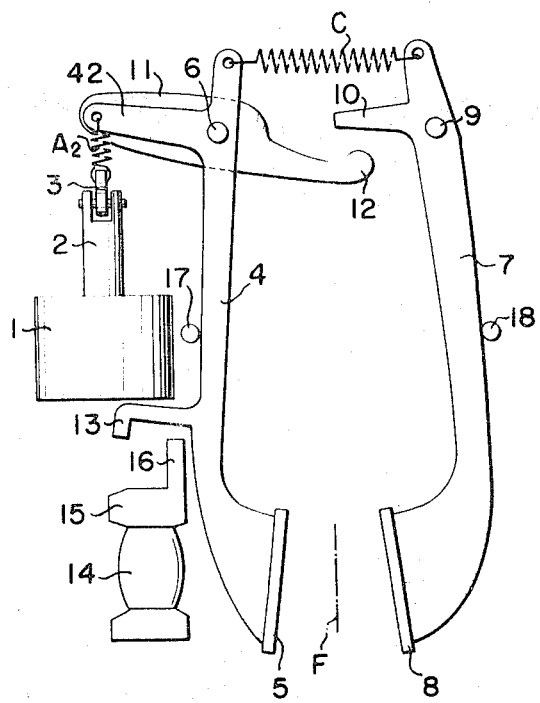
FIG. 1 is a side elevational view of an embodiment of the pressure plate means according to the invention and shows the state of the pressure plate means before it is actuated.
Figure 2:
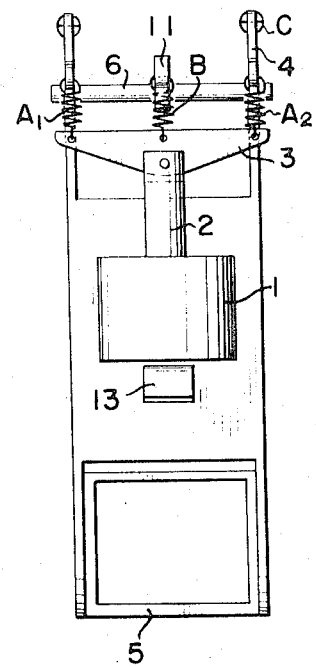
FIG. 2 is a front elevational view of the pressure plate means of the invention shown in FIG. 1.

Referring to the drawing, numeral 1 designates a solenoid which pulls a balance plate 3 downward by means of a plunger 2, as shown in FIGS. 1, 2 and 6. The balance plate 3 has the lower ends of tension springs $A_1$, $A_2$ of the same strength and a tension spring B anchored thereto, said tension spring B being slightly longer or weaker in tensile strength than said tension spring $A_1$, $A_2$. Numeral 4 designates a first lever pivotally mounted on a pivot 6 and carrying a first pressure plate member 5 at one end thereof, with the other end being pulled by a spring C in a direction to move said pressure plate member 5 away from the focal plane. Arms 41, 42 of the first lever 4 have the upper ends of the tension springs $A_1$, $A_2$ anchored thereto respectively. Thus, it will be understood that, upon actuation of the solenoid 1, the first lever 4 is caused to make a pivotal movement through the tension spring $A_1$, $A_2$ in a counterclockwise direction as viewed in the drawing or in a direction to move the pressure plate member 5 toward the focal plane.

Numeral 7 designates a second lever pivotally mounted on a pivot 9 and carrying a second pressure plate member 8 at one end thereof in opposed relation to the first pressure plate member 5, the other end of said second lever being pulled by the spring C in a direction to move said second pressure plate member 8 away from the focal plane. Numeral 10 designates an arm formed on the second lever 7 and numeral 11 designates a third lever pivotally mounted on the pivot 6. The arrangement is such that when the third lever 11 makes a pivotal movement in a counterclockwise direction, its end 12 abuts against the arm 10, causing the second lever 7 to make a pivotal movement in a clockwise direction, whereby the second pressure plate member 8 is moved toward the focal plane F.

The other end of the third lever 11 is pulled downwardly by the tension spring B upon actuation of the plunger 2. Numeral 13 designates a positioning arm formed on the first lever 4, which is engaged by a reference 16 provided on a bodytube 15 of a lens 14, when the first pressure plate member 5 has reached the focal plane F.

When the solenoid is held de-energized, the upper ends of the first and second levers 4, 7 are biased inwardly of each other by the spring C, so that said first and second levers 4, 7 are opened to positions defined by stoppers 17, 18 respectively and held in the open positions.

Now, the operation of the pressure plate means of the invention constructed as described above will be described.

In retrieving a frame desired to be projected, prior to the projection, the solenoid is held de-energized and the film is moved to locate the desired frame in a position in register with the optical axis of the projection lens 14. Therefore, the film is not subjected to damage during its movement.

Figure 3:
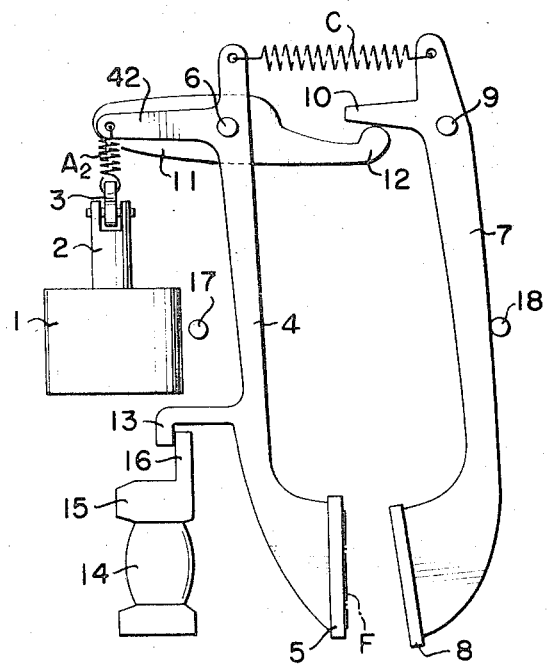
FIG. 3 is a side elevational view similar to FIG. 1 but shows the state in which one of the pressure plate members is positioned in the focal plane.

Then, the solenoid 1 is actuated, whereby the tension springs $A_1$, $A_2$, B are pulled through the plunger 2 and the balance plate 3. Since the tension springs $A_1$, $A_2$ are stronger or shorter than the tension spring B, as stated above, the first lever 4 is caused to make a pivotal movement at first in a counterclockwise direction and the positioning arm 13 is brought into abutment against the reference plane 16. Thus, the first pressure plate member 5 is positioned in the focal plane F (see FIG. 3). A further movement of the solenoid 1 causes the third lever 11 to make a pivotal movement in a counterclockwise direction by way of the tension spring B. Therefore, the end 12 of the third lever 11 pushes the arm 10 of the second lever 7 upwardly, causing said second lever 7 to make a pivotal movement in a clockwise direction. Thus, the second pressure plate member 8 on the second lever 7 is moved toward the focal plane F to clamp the film between it and the first pressure plate member 5, whereby said film is positioned in the focal plane (see FIG. 4). In this case, the force biasing the first pressure plate member 5 toward the focal plane F is greater than the force biasing the second pressure plate member 8 toward the same, because the tension springs $A_1$, $A_2$ are stronger or shorter than the tension spring B, and therefore, in no case is the film displaced longitudinally from the focal plane in the state of FIG. 4.

I claim:

1. Pressure plate means adapted to be used in a projector, comprising a first lever having a first pressure plate member at an end thereof, a second lever having a second pressure plate member at an end thereof, means for moving said first lever to a position where said first pressure plate member is in the focal plane of said projector, and means for moving said second lever after said first lever is moved to said position to a position where said second pressure plate member abuts on said first pressure plate member wherein said first lever moving means moves the first lever with a force greater than that of said second lever moving means.

2. Pressure plate means as defined in claim 1, wherein said first lever moving means comprises a solenoid, a first tension spring extended between said solenoid and said first lever, and positioning means for positioning said first lever in the position where said first pressure plate is in the focal plane.

3. Pressure plate means as defined in claim 2, wherein said positioning means comprises a positioning portion projecting from a portion of said first lever and a reference plane formed at a portion of a lens body-tube and serving as a stopper for said positioning portion.

4. Pressure plate means as defined in claim 2, wherein said second lever moving means comprises a third lever and a second tension spring extended between said solenoid and said third lever.

5. Pressure plate means as defined in claim 4, wherein said first tension spring has a tension stronger than that of said second tension spring.

6. Pressure plate means as defined in claim 4, wherein said first tension spring is shorter than said second tension spring.

7. Pressure plate means as defined in claim 1; wherein said second lever moving means comprise a solenoid, a third lever and a second tension spring extended between said solenoid and said third lever to move said second lever by its tension.

8. Pressure plate means as defined in claim 1, wherein said first lever and said second lever are coupled with each other by means of a tension spring which biases both of said levers to open positions.

9. Pressure plate means for use in a projector, comprising:

a. a first lever having a first pressure plate at one end thereof, said first lever being pivotally mounted near the other end thereof;

b. a second lever having a second pressure plate at one end thereof, said second lever being pivotally mounted near the other end thereof;

c. first means for moving said first lever to a position in which said first pressure plate is in the focal plane of the projector, said first means including a first arm extending from said first lever near the other end thereof, a first spring connected to said first arm, means connected to the other end of said first spring for producing a force, and a means for stopping the movement of said first lever when the first pressure plate is at the focal point of the projector; and d. second means for moving said second pressure plate to abut said first pressure plate wherein said second means moves said second pressure plate after said first pressure plate is positioned at the focal plane, said second moving means including a second arm pivotally connected to said first lever near said other end thereof, a second spring connected to said second arm at one end thereof and to said force producing means, said first spring having a tension that is stronger than said second spring, a third arm connected to said second lever at the other end thereof, the other end of said second arm contacting and moving said third arm when said first pressure plate is moved into the focal plane position.

* * * * *